United States Patent
Seto et al.

(12)

(10) Patent No.: US 6,444,020 B1
(45) Date of Patent: Sep. 3, 2002

(54) TETRAALKYL-SUBSTITUTED NITROGEN-CONTAINING HETERO RING-BONDED AZO DYE, INK-JET INK COMPRISING SAID DYE, INK-JET RECORDING METHOD USING SAID INK, AND THERMAL TRANSFER RECORDING MATERIAL COMPRISING SAID DYE

(75) Inventors: Nobuo Seto; Takayoshi Kamio, both of Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/551,230

(22) Filed: Apr. 17, 2000

(30) Foreign Application Priority Data

Apr. 16, 1999 (JP) .............................. 11-109654

(51) Int. Cl.⁷ ................. C09D 11/02; C09B 29/036
(52) U.S. Cl. ................ 106/31.46; 106/31.48; 106/31.5; 534/751; 534/752; 534/799; 534/800
(58) Field of Search ............ 106/31.46, 31.48, 106/31.5; 534/751, 752, 799, 800, 759

(56) References Cited

U.S. PATENT DOCUMENTS

| | | | | |
|---|---|---|---|---|
| 4,562,248 A | * | 12/1985 | Weaver et al. | 534/630 |
| 4,631,085 A | * | 12/1986 | Kawanishi et al. | 106/31.43 |
| 5,306,815 A | * | 4/1994 | Hahn et al. | 428/195 |
| 5,389,596 A | * | 2/1995 | Etzbach et al. | 106/31.48 |
| 5,725,644 A | * | 3/1998 | Sano et al. | 106/31.48 |
| 5,980,622 A | * | 11/1999 | Byers | 106/31.48 |
| 6,136,080 A | * | 10/2000 | Evans et al. | 106/31.5 |
| 6,174,356 B1 | * | 1/2001 | Evans et al. | 106/31.48 |
| 6,200,370 B1 | * | 3/2001 | Fujiwara et al. | 106/31.48 |

* cited by examiner

Primary Examiner—Helene Klemanski
(74) Attorney, Agent, or Firm—Burns, Doane, Swecker & Mathis, LLP

(57) ABSTRACT

Disclosed are an azo dye having the following formula (1), an ink-jet ink comprising the aforesaid azo dye, an ink-jet recording method using the aforesaid ink-jet ink, and a thermal transfer recording material comprising the aforesaid azo dye:

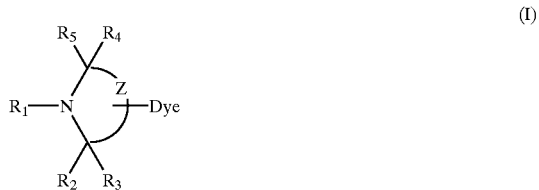

(I)

wherein Z represents an atomic group which forms, together with a nitrogen atom, a five-, six- or seven-membered ring, $R_1$ represents a hydrogen atom, an oxy radical, an aliphatic group, an aliphatic oxy group, an acyl group, an aliphatic oxycarbonyl group, an aryloxycarbonyl group or an acyloxy group, $R_2$, $R_3$, $R_4$ and $R_5$, which may be the same or different, each represents an alkyl group, or $R_2$ and $R_3$ and/or $R_4$ and $R_5$ may be combined with each other to form a ring, and Dye represents a dye moiety group necessary for forming an azo dye.

20 Claims, No Drawings

TETRAALKYL-SUBSTITUTED NITROGEN-CONTAINING HETERO RING-BONDED AZO DYE, INK-JET INK COMPRISING SAID DYE, INK-JET RECORDING METHOD USING SAID INK, AND THERMAL TRANSFER RECORDING MATERIAL COMPRISING SAID DYE

FIELD OF THE INVENTION

The present invention relates to a 2,2,6,6-tetraalkyl-substituted nitrogen-containing hetero ring-bonded azo dye-having high fastness to light, heat, air and chemicals. Further, the invention relates to an ink-jet recording method and, more particularly, to ink-jet ink for formation of images having excellent hue and high fastness to light, heat, air, water and chemicals, and to an ink-jet recording method using such ink. Furthermore, the invention is concerned with a thermal transfer recording material for recording images by the heating corresponding to image information.

BACKGROUND OF THE INVENTION

Various requisites, including high solubilities in solvents, capability for high-density recording, good hue, high fastness to light, heat, air, water and chemicals, such high fixability to image-receiving materials as to make the ink bleeding, excellent keeping quality as the ink, no toxicity high purity and availableness at a low price, are requisites of a coloring matter for ink-jet ink. However, it is very difficult to select a coloring matter satisfying those requirements at a high level. In particular, it is intensely desired for the coloring matter to have excellent fastness to light.

From the aforementioned viewpoints, various dyes and pigments for ink-jet ink have been proposed and examined. However, none of known coloring matters is a coloring matter meeting all the foregoing requirements. For instance, both hue requirement and fastness requirement are difficult to simultaneously fulfill by the use of known dyes and pigments having C.I. numbers.

SUMMARY OF THE INVENTION

An object of the invention is to provide an azo dye having excellent spectral characteristics and high fastness to light, heat, air and chemicals.

Another object of the invention is to obtain ink-jet ink and an ink-jet recording method suitable for forming images of high fastness.

Still another object of the invention is to provide a thermal transfer dye donating material comprising an azo dye having high stability to light, heat, air and chemicals.

As a result of our intensive studies, the azo dyes represented by the following formula (I) have been discovered, and it has been found that these azo dyes enabled effective attainment of the aforementioned objects to provide highly fast images and to overcome the defects of prior arts.

More specifically, the foregoing objects are achieved by the following embodiments (1) to (5) of the invention:

(1) An azo dye represented by the following formula (I);

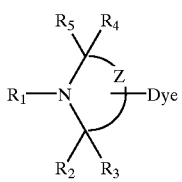

(I)

wherein Z represents an atomic group which forms, together with a nitrogen atom, a five-, six- or seven-membered ring, $R_1$ represents a hydrogen atom, an oxy radical, an aliphatic group, an aliphatic oxy group, an acyl group, an aliphatic oxycarbonyl group, an aryloxycarbonyl group or an acyloxy group, $R_2$, $R_3$, $R_4$ and $R_5$, which may be the same or different, each represents an alkyl group, or $R_2$ and $R_3$ and/or $R_4$ and $R_5$ may be combined with each other to form a ring, and Dye represents a dye moiety group necessary for forming an azo dye.

(2) An azo dye as described in Embodiment (1), which dye is represented by the following formula (Ia)

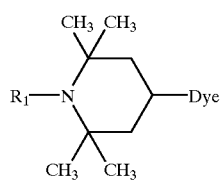

(Ia)

wherein $R_1$ and Dye denote the same meanings as those defined for formula (I).

(3) Ink-jet ink comprising an azo dye represented by the above formula (I). Further, the azo dye represented by the above formula (1a) is more preferred.

(4) An ink-jet recording method which comprises jetting ink as oil droplets to record images on an image-receiving material, said ink being ink as described in Embodiment (3).

(5) A thermal transfer recording material comprising a thermal transfer dye donating material and a thermal transfer image-receiving material, said dye donating material containing at least one azo dye represented by the formula (I) defined in Embodiment (1). Further, the azo dye represented by the formula (I) is preferably represented by the formula (Ia).

DETAILED DESCRIPTION OF THE INVENTION

When the groups relating to the invention contain an aliphatic moiety, the aliphatic moiety may be a saturated or unsaturated one having a straight-chain, branched or cyclic form, with examples including alkyl, alkenyl, cycloalkyl and cycloalkenyl groups. These groups each may have no substituent group or at least one substituent group. in another case where the groups relating to the invention contain an aryl moiety, the aryl moiety may be a single ring or a condensed ring, which may have no substituent group or at least one substituent group. In the other case where the groups relating to the invention contain a heterocyclic moiety, the heterocyclic moiety has at least one hetero atom (e.g., nitrogen, sulfur and oxygen) in the ring, and the ring may be a saturated or unsaturated ring which may be a single or condensed ring having no or at least one substituent group.

The term "substituent group" as used in the invention describes all groups which can be substituted for hydrogen atoms, with examples including an aliphatic group, an aryl group, a heterocyclic group, an acyl group, an acyloxy group, an acylamino group, an aliphatic oxy group, an aryloxy group, a heterocyclic oxy group, an aliphatic oxycarbonyl group, an aryloxycarbonyl group, a heterocyclic oxycarbonyl group, a carbamoyl group, an aliphatic sulfonyl group, an arylsulfonyl group, a heterocyclic sulfonyl group, an aliphatic sulfonyloxy group, an arylsulfonyloxy group, a heterocyclic sulfonyloxy group, a sulfamoyl group, an aliphatic sulfonamido group, an arylsulfonamido group, a heterocyclic sulfonamido group, an aliphatic amino group, an arylamino group, a heterocyclic amino group, an aliphatic oxycarbonylamino group, an aryloxycarbonylamino group, a heterocyclic oxycarbonylamino group, an aliphatic sulfinyl group, an arylsulfinyl group, an aliphatic thio group, an arylthio group, a hydroxy group, a cyano group, a sulfo group, a carboxyl group, an aliphatic oxyamino group, an aryloxyamino group, a carbamoylamino group, a sulfamoylamino group, a halogen atom, a sulfamoylcarbamoyl group, a carbamoylsulfamoyl group, a dialiphatic oxyphosphinyl group and a diaryloxyphosphinyl group.

In formula (I), Z represents an atomic group which forms, together with a nitrogen atom, a five-, six- or seven-membered ring, preferably a five- or six-membered ring, and more . preferably a six-membered ring. Examples of the five-, six- or seven-membered rings include a piperidine ring and a pyrrolidine ring, and a piperidine ring being preferred. Further, these rings may have a substituent group other than the groups represented by $R_2$ to $R_5$, such as the groups shown in the above-described examples of the "substituent groups" as used in the invention.

$R_1$ in formula (I) represents a hydrogen atom; an oxy radical; an aliphatic group, preferably an unsubstituted or substituted alkyl group containing at most 10 carbon atoms, such as methyl, ethyl or 2-methanesulfonamidoethyl group, or an unsubstituted or substituted alkenyl group containing at most 10 carbon atoms, such as allyl or vinyl group; an aliphatic oxy group, preferably an unsubstituted or substituted alkoxy group containing at most 10 carbon atoms, such as methoxy, ethoxy or 2-methoxyethoxy group, or an unsubstituted or substituted alkenyloxy group containing at most 10 carbon atoms, such as allyloxy group; an acyl group, preferably an unsubstituted or substituted alkylcarbonyl group containing at most 10 carbon atoms, such as acetyl or propionyl group, or an unsubstituted or substituted alkenylcarbonyl group containing at most 10 carbon atoms, such as acryloyl or methacryloyl group; an unsubstituted or substituted arylcarbonyl group containing at most 10 carbon atoms,. such as benzoyl group; an aliphatic oxycarbonyl group, preferably an unsubstituted or substituted alkoxycarbonyl group containing at most 10 carbon atoms, such as methoxycarbonyl or ethoxycarbonyl group, or an unsubstituted or substituted alkenyloxycarbonyl group containing at most 10 carbon atoms, such as allyloxycarbonyl group; an aryloxycarbonyl group, preferably an unsubstituted or substituted aryloxycarbonyl group containing at most 12 carbon atoms, such as phenoxycarbonyl group; or an acyloxy group, preferably an unsubstituted or substituted alkylcarbonyloxy group containing at most 10 carbon atoms, such as acetoxy or propanoyloxy group, or an unsubstituted or substituted arylcarbonyloxy group containing at most 12 carbon atoms, such as benzoyloxy group.

So far as the effects of the invention are concerned, it is desirable for $R_1$ to be a hydrogen atom, an oxy radical, an aliphatic group or an aliphatic oxy group, more preferably a hydrogen atom or an oxy radical, most preferably an oxy radical.

$R_2$, $R_3$, $R_4$, and $R_5$, which may be the same or different, each represents an alkyl group (having 1 to 20 carbon atoms, preferably 1 to 8 carbon atoms, and more preferably 1 to 3 carbon atoms, such as methyl, ethyl and n-propyl). Further, $R_2$ and $R_3$ and/or $R_4$ and $R_5$ may be combined with each other to form a ring (preferably a five-, six- or seven-membered ring, such as cyclohexyl).

Dye represents a dye moiety necessary for forming an azo dye.

The azo dye represented by the formula (I) is preferably a compound represented by the foregoing formula (Ia):

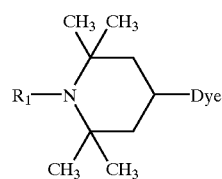

(Ia)

wherein $R_1$ and Dye denote the same meanings as those defined for formula (I), and the preferred range thereof is also the same.

Dye preferably represents a moiety derived from an azo dye represented by the following formula (II):

$$A-N=N-B \qquad (II)$$

wherein A and B each represent an aromatic group or a heterocyclic group which can be substituted for the hydrogen on the piperidine ring. More specifically, it is desirable for A to be an aryl group, such as a phenyl or naphthyl group, or a heterocyclic group, such as a pyrazolyl, isothiazolyl, thiazolyl, pyrazolotriazolyl or pyrrolotriazolyl group, preferably a phenol derivative (preferably represented by the following formula (A-1)), a naphthol derivative (preferably represented by the following formula (A-2)), an aniline derivative (preferably represented by the following formula (A-3)), a pyrazole derivative (preferably represented by the following formula (A-4)), a pyrazolotriazole derivative (preferably represented by the following formula (A-5)) or a pyrrolotriazole derivative (preferably represented by the following formula (A-6)), more preferably a phenol derivative (preferably represented by the following formula (A-1)), an aniline derivative (preferably represented by the following formula (A-3)), a pyrazole derivative (preferably represented by the following formula (A-4)) or a pyrazolotriazole derivative (preferably represented by the following formula (A-5)), most preferably a phenol derivative (preferably represented by the following formula (A-1)) The following are general structural formulae preferred as A:

Formula (A-1)

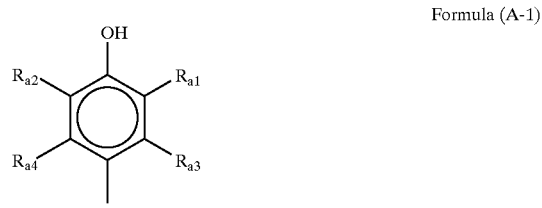

Formula (A-2)

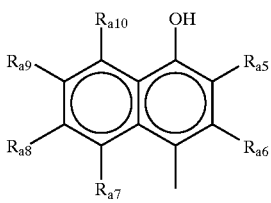

Formula (A-3)

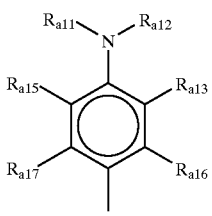

Formula (A-4)

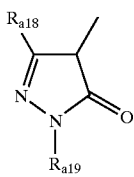

Formula (A-5)

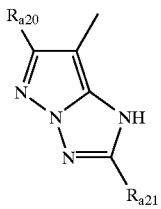

Formula (A-6)

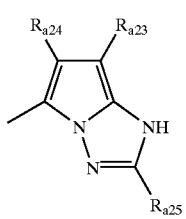

In the formulae (A-1) to (A-6), each of $R_{a1}$ to $R_{a13}$, $R_{a15}$ to $R_{a21}$ and $R_{a23}$ to $R_{a25}$ represents a hydrogen atom or a substituent group.

It is desirable for each of $R_{a1}$ and $R_{a2}$ to be an acylamino group (preferably an unsubstituted or substituted acylamino group containing 2 to 20 carbon atoms, such as acetylamino, propionylamino, benzoylamino or 3-(N-4-(1-oxyradical-2, 2,6,6-tetramethylpiperidylcarbamoyl)propionyl-amino group), an alkyl group (preferably an unsubstituted or substituted alkyl group containing 1 to 8 carbon atoms, such as methyl or pivaloyl group), a halogen atom (e.g., fluorine, chlorine) or an aliphatic oxycarbonylamino group (preferably an unsubstituted or substituted alkoxycarbonylamino group containing 2 to 10 carbon atoms, such as methoxycarbonylamino or butoxycarbonylamino group). Further, the group preferred as $R_{a1}$ is an acylamino group, and the group preferred as $R_{a2}$ is also an acylamino group (which may have a substitutent group or may be bonded to the tetraalkyl-substituted nitrogen-containing hetero ring group).

It is desirable for each of $R_{a3}$ and $R_{a4}$ to be a hydrogen atom.

Then, B is illustrated below in detail. It is desirable for B to be an aryl group, such as a phenyl or naphthyl group, or a heteryl group, such as a pyrazolyl, isothiazolyl, thiazolyl, thiadiazolyl, benzoisothiazolyl or hetero ring-condensed isdthiazolyl group, preferably a pyrazolyl derivative (preferably represented by the following formula (B-1)), an isothiazolyl derivative (preferably represented by the following formula (B-2)), a thiadiazolyl derivative (preferably represented by the following formula (B-3)) or a benzoisothiazolyl derivative (preferably represented by the following formula (B-4)), more preferably an isothiazolyl derivative (preferably represented by the following formula (B-2)), a thiadiazolyl derivative (preferably represented by the following formula (B-3)) or a benzoisothiazolyl derivative (preferably represented by the following formula (B-4)), still more preferably a thiadiazolyl derivative (preferably represented by the following formula (B-3) or a benzoisothiazolyl derivative (preferably represented by the following formula (B-4)), and most preferably a benzoisothiazolyl derivative (preferably represented by the following formula (B-4)). The following are general structural formulae preferred as B:

Formula (B-1)

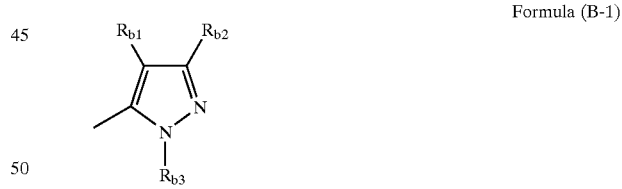

Formula (B-2)

Formula (B-3)

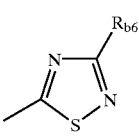

Formula (B-4)

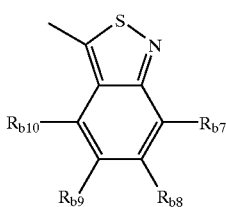

In formulae (B-1) to (B-4), each of $R_{b1}$ to $R_{b10}$ represents a hydrogen atom or a substituent group.

It is desirable for to be an aryl group (preferably an unsubstituted or substituted aryl group containing 6 to 20 carbon atoms, such as a phenyl or 3-methanesulfonylphenyl group). Such an aryl group may be linked to 2,2,6,6-tetramethylpiperidinyl group.

The group preferred as $R_{b9}$ is an aliphatic sulfonyl group (especially an unsubstituted or substituted alkylsulfonyl group containing 1 to 8 carbon atoms, such as mothylsulfonyl group), a sulfo group or a sulfamoyl group (which may have no substituent, one substituent or two substituents at the site of the nitrogen atom, preferably which has at the site of the nitrogen atom a 4-(1-oxyradical-2,2,6,6-tetramethyl-piperidiyl group as a substituent).

It is desirable for each of $R_{b7}$, $R_{b8}$ and $R_{b10}$ to be a hydrogen atom.

So far as the effects of the invention are concerned, the azo dye moiety represented by formula (II) is preferably a heterylazophenol dye comprised of a group represented by formula (A-1) and a group represented by any of formulae (B-1) to (B-4), more preferably an isothiazolylazophenol dye, a thiadiazolylazophenol dye or a benzoisothiazolylazo-phenol dye, most preferably a thiadiazolylazophenol dye or a benzoisothiazolylazophenol dye.

In formula (I), the azo dye moiety may be bonded to the tetraalkyl-substituted nitrogen-containing hetero ring (in formula (Ia), the 2,2,6,6-tetramethylpiperidine ring) at any of possible positions, and the bonding position may be situated in either A or B as a constituent of formula (II) The suitable site for the foregoing piperidine ring substitution of A is $R_{a1}$, $R_{a2}$, $R_{a5}$, $R_{a7}$, $R_{a11}$, $R_{a12}$, $R_{a15}$, $R_{a19}$, $R_{a21}$ or $R_{a24}$, and that of B is $R_{b3}$, $R_{b5}$, $R_{b6}$, $R_{b8}$, $R_{b9}$ or $R_{10}$. Each of these groups may be bonded to the foregoing piperidine ring by a mere bonding hand or a divalent linkage group. Examples of a divalent linkage group which enables such bonding include a divalent aliphatic group, a divalent aryl group, —CO—, —COO—, —CONH—, —O—, —NHCO—, —OCO—, —SO$_2$O—, —SO$_2$NH—, —NH—, and —OCONH—. The group preferred as a group bonded to the tetraalkyl-substituted nitrogen-containing hetero ring is a sulfonamido group (where the tetraalkyl-substituted nitrogen-containing hetero ring group is bonded to the nitrogen atom), an acylamino group (where the tetraalkyl-substituted nitrogen-containing hetero ring group is bonded to the nitrogen atom) or a carbonyloxy group (where the tetraalkyl-substituted nitrogen-containing hetero ring group is bonded to the oxygen atom), especially a sulfonamido group (where the tetraalkyl-substituted nitrogen-containing hetero ring group is bonded to the nitrogen atom) or an acylamino group (where the tetraalkyl-substituted nitrogen-containing hetero ring group is bonded to the nitrogen atom). Further, in these cases, the tetraalkyl-substituted nitrogen-containing hetero ring group is preferably a 2,2,6,6-tetramethylpiperidyl group.

Suitable examples of a coloring matter represented by formula (I) according to the invention are illustrated below, but the invention should not be construed as being limited to these examples.

When the coloring matter represented by formula (I) is used as water-soluble dye, it is desirable to introduce an ionic hydrophilic group into Dye. Examples of an ionic hydrophilic group include a sulfo group, a carboxyl group and a quaternary ammonium group. In particular, it is advantageous that Dye have at least one sulfo group.

On the other hand, in the case of using a coloring matter represented by formula (I) as oil-soluble dye, it is desirable for the coloring matter to have no sulfo group.

(1)

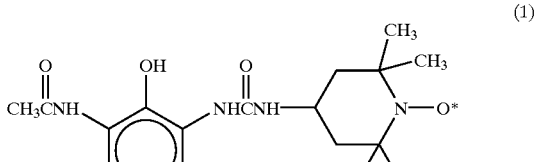

(2)

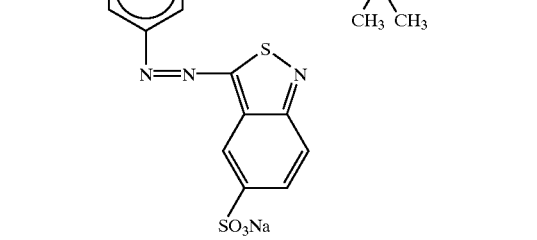

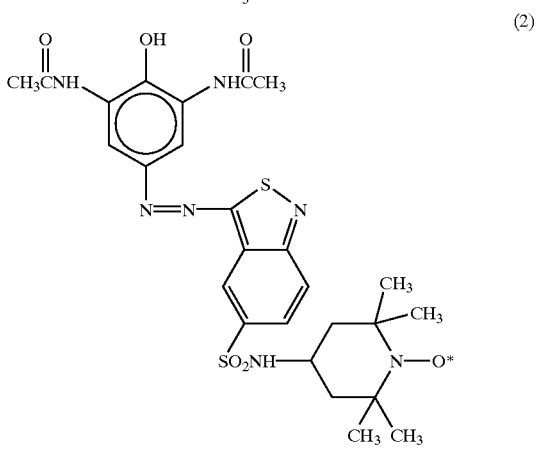

(3)

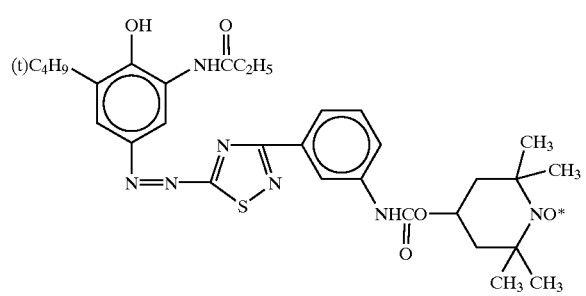

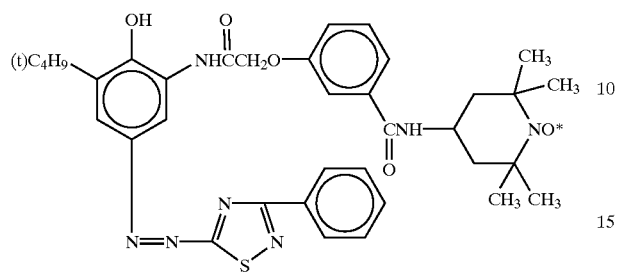
(4)
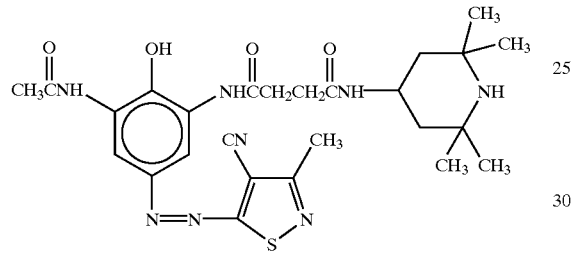
(5)
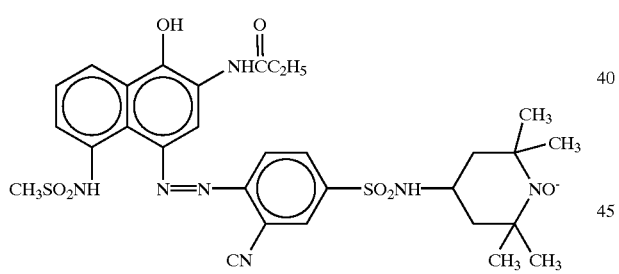
(6)
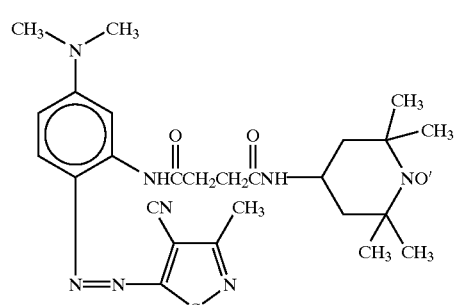
(7)
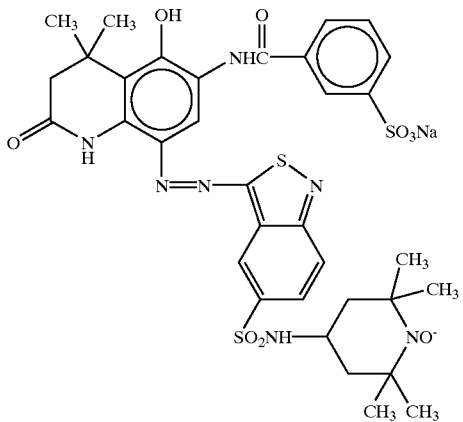
(8)
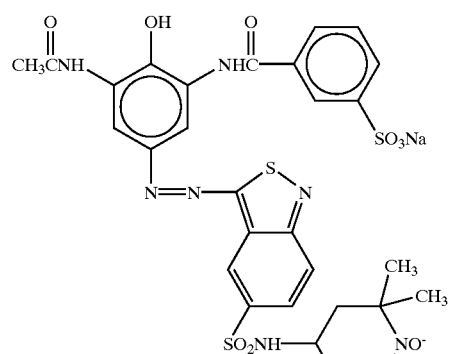
(9)
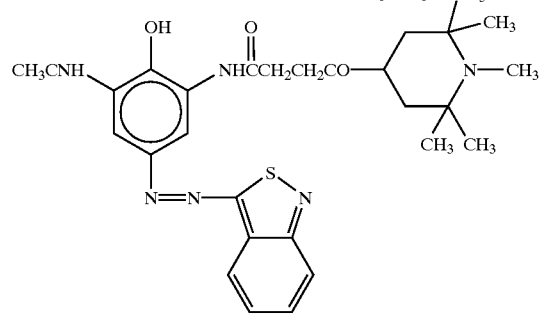
(10)
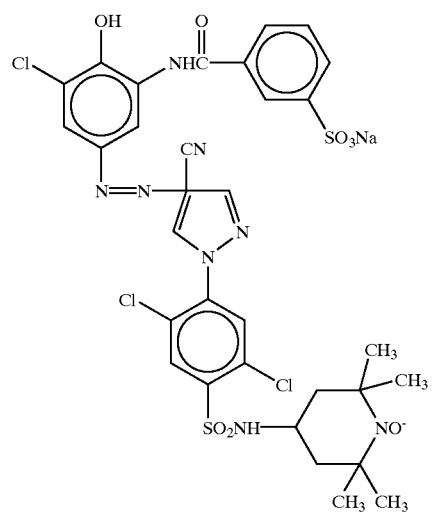
(11)

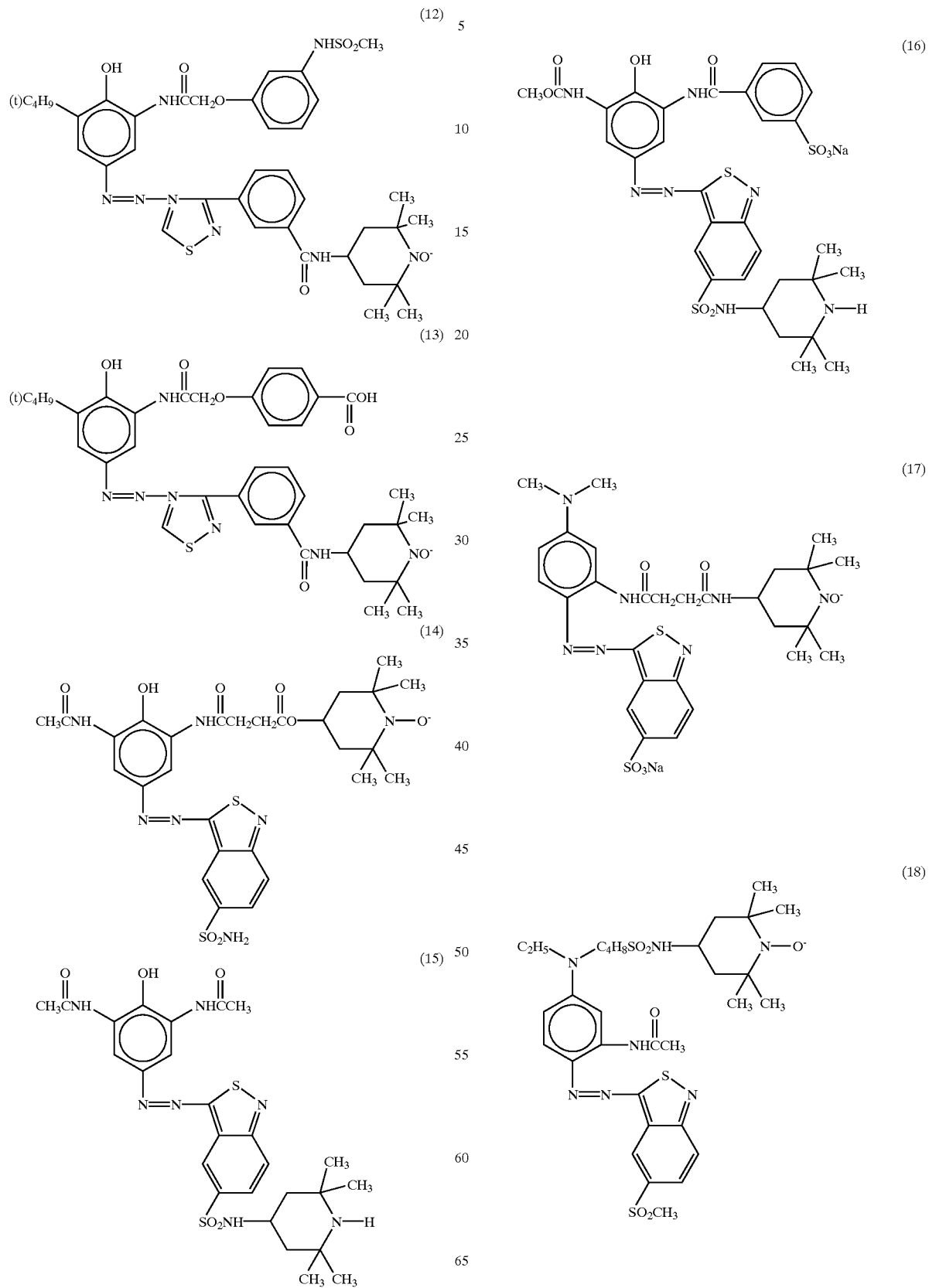

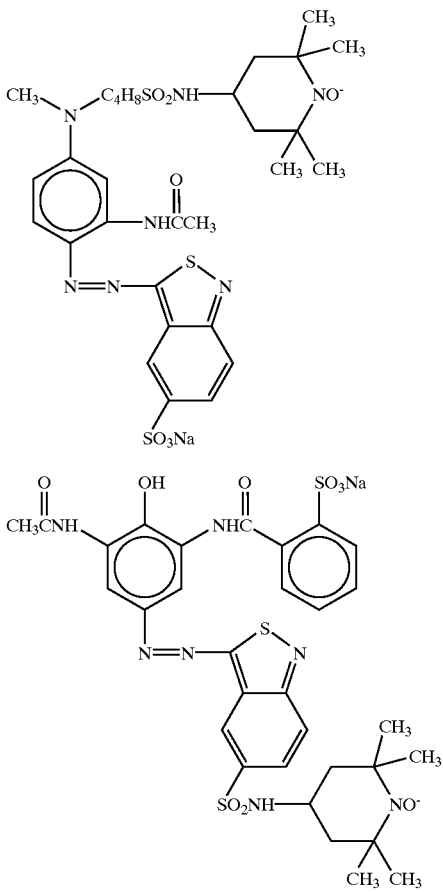

The synthesis of an azo dye represented by formula (I). can be carried out using a method of bonding in advance-the nitrogen-containing hetero ring derivative (preferably a 2,2, 6,6-tetramethylpiperidine derivative) to the A or B part of formula (II) and then subjecting them to an azo coupling reaction, or a method of synthesizing an azo dye, introducing an appropriate functional group into the azo dye and then reacting the resultant azo dye with the nitrogen-containing hetero ring derivative (preferably a 2,2,6,6-tetramethylpiperidine derivative). Although both methods may be adopted herein, the latter method is simpler and easier and thus is preferable.

Syntheses of azo dyes according to the invention are described specifically in Examples.

As to the ink-jet recording methods, a method of using oil-based ink, a method of using water-based ink and a method of using ink which is in a solid state at room temperature have been adopted. The ink-jet ink comprising the present dye can be applied to any of the aforementioned methods.

The solvents usable for the present ink and the ways of using them are illustrated below.

The liquid medium of oil-based ink according to the invention comprises mainly a solvent selected properly from general organic solvents depending on the situation. Examples of an organic solvent usable as the liquid medium include alcohols, such as ethanol, pentanol, heptanol, octanol, cyclohexanol, benzyl alcohol, phenylethyl alcohol, phenylpropyl alcohol, furfuryl alcohol and anise alcohol; glycol derivatives, such as ethylene glycol monoethyl ether, ethylene glycol monophenyl ether, diethylene glycol mono- ethyl ether, diethylene glycol monobutyl ether, propylene glycol monoethyl ether, propylene glycol monophenyl ether, dipropylene glycol monomethyl ether, dipropylene glycol monoethyl ether, triethylene glycol monoethyl ether, ethylene glycol diacetate, ethylene glycol monoethyl ether acetate and propylene glycol diacetate; ketones, such as. benzyl methyl ketone, diacetone alcohol and cyclohexanone; ethers, such as butyl phenyl ether, benzyl ethyl ether and hexyl ether; esters, such as ethyl acetate, amyl acetate, benzyl acetate, phenylethyl acetate, phenoxyethyl acetate, ethyl phenylacetate, benzyl propionate, ethyl benzoate, butyl benzoate, ethyl laurate, butyl laurate, isopropyl myristate, isopropyl palmitate, triethyl phosphate, tributyl phosphate, diethyl phthalate, dibutyl phthalate, diethyl malonate, dipropyl malonate, diethyl diethylmalonate, diethyl succinate, dibutyl succinate, diethyl glutarate, diethyl adipate, dibutyl adipate, di(2-methoxyethyl) adipate, diethyl sebacate, diethyl maleate, dibutyl maleate, dioctyl maleate, diethyl fumarate, dioctyl fumarate and 3-hexenyl cinnamate; hydrocarbon solvents, such as petroleum ether, petroleum benzine, tetralin, decalin and 1-amylbenzene, dimethylnaphthalene; and polar solvents, such as acetonitril, formamide, N,N-dimethylformamide, N,N-dimethylacetamide, dimethyl sulfoxide, sulfolane, propylene carbonate, N-methyl-2-pyrrolidone, N-vinyl-2-pyrrolidone and N,N-diethyldodecanamide. These solvents may be used alone or as mixture of two or more thereof.

The present dyes each may be used in the sate- of being dissolved in any of the organic solvents recited above or dispersed therein together with an appropriate dispersants. To be more concrete, such oil-based ink for ink-jet ink can be prepared referring to the methods disclosed in JP-A-3-231975 (the term "JP-A" as used herein means an "unexamined published Japanese patent application") and JP-W-5-508883 (the term "JP-W" as used herein means a "re-publication of PCT international patent publication in Japan").

The liquid medium of water-based ink according to the invention can be comprised mainly of water and a water-soluble organic solvent properly selected depending on the situation. Examples of such a water-soluble organic solvent include alcohols, such-as methanol, ethanol, propanol, isopropanol, butanol, isobutanol, sec-butanol, t-butanol, pentanol, hexanol, cyclohexanol and benzyl alcohol; polyhydric alcohols, such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thiodiglycol; glycol derivatives, such as ethylene glycol monomethyl ether, ethylene glycol monoethyl ether, ethylene glycol monobutyl ether, diethylene glycol monomethyl ether, diethylene glycol monobutyl ether, poropylene glycol monomethyl ether, proopylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether and ethylene glycol monophenyl ether; amines, such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine and tetramethylpropylenediamine; and polar solvents, such as formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone. Any two or more of these solvents may be used in combination with water.

The present dyes may be used in the state of being dissolved in a mixture of water with any of the above-recited solvents. When they are insoluble in such a mixture, on the other hand, the present dyes may be used in the state of being dispersed as fine grains by means of a variety of dispersing apparatus (erg., a ball mill, a sand mill, an attrition mill, a roll mill, an agitator mill, a Henshel-type mixer, a colloid mill, an ultrasonic homogenizer, a pearl mill, a jet mill, an Ong mill), or in the state that they are in advance dissolved in an appropriate organic solvent and then dispersed with the aid of a dispersant or surfactant.

To be more concrete, such water-based ink used for ink-jet ink can be prepared referring to the methods disclosed, e.g., in JP-A-5-148436, JP-A-5-295312, JP-A-7-97541, JP-A-7-82515 and JP-A-7-118584.

The liquid medium usable for the present solid ink is a phase change solvent of the type which is solid at room temperature but becomes liquid by being molten at the time when the ink is heated and jetted. Examples of such a phase change solvent include natural waxes, such as beeswax, carnauba wax, rice wax, Japan wax, jojoba oil, spermaceti, candellila wax, lanolin, montan wax, ozokerite, ceresin, paraffin wax, microcrystalline wax and petrolatum; polyethylene wax; chlorinated hydrocarbons; organic acids, such as palmitic acid, stearic acid, behenic acid, tiglic acid, 2-acetonaphthobehenic acid, 12-hydroxystearic acid and dihydroxystearic acid; alcohols, such as dodecanol, tetradecanol, hexadecanol, eicosanol, docosanol, tetracosanol, hexacosanol, octacosanol, dodecenol, myricyl alcohol, tetracenol, hexadecenol, eicosenol, docosenol, pinene glycol, hinokiol, butynediel, nonanediol, isophthalyl alcohol, mesicerin, hexanediol, decanediol, tetradecanediol, hexadecanediol, docosanediol, tetracosanediol, turpentinol, phenyl glycerin, eicosanediol, octanediol and phenylpropylene glycol; phenols, such as bisphenol A and p-α-cumylphenol; esters formed from the organic acids as recited above and glycerin, ethylene glycol or diethylene glycol; cholesterol fatty acid esters, such as chlosterol stearate, chlosterol palmitate, cholesterol myristate, cholesterol behenate, cholesterol laurate and cholesterol melissate; saccharide fatty acid esters, such as saccharose stearate, saccharose palmitate, saccharose behenate, saccharose laurate, saccharose melissate, lactose stearate, lactosepalmitate, lactose behenate, lactose laurate and lactose melissate; ketones, such as benzoyl acetone, diacetobenzene, benzophenone, tricosanone, heptacosanone, heptatriacontanone, hentriacontanone, stearone and laurone; amides, such as oleic acid amide, lauric acid amide, stearic acid amide, ricinolic acid amide, palmitic acid amide, tetrahydrofuranic acid amide, erucic acid amide, myristic acid amide, 12-hydroxystearic acid amide, N-stearylerucic acid amide, N-oleylstearic acid amide, N,N-ethylenebislauric acid amide, N,N-ethylenebisstearic acid amide, N,N-ethylenebisbehenic acid amide, N,N-xylylenebisstearic acid amide, N,N-butylenebisstearic acid amide, N,N-dioleyladipic acid amide, N,N-dioleylsebacic acid amide, N,N-distearylsebacic acid amide, N,N-distearyllterephthalic acid amide, phenacetin, toluamide and acetamide; and sulfonamides, such as p-toluenesulfonamide, ethylbenzene-sulfonamide and butylbenzenesulfonamide.

The suitable phase change temperature for the solid solvent of the present ink is from 600° C. to 200° C., preferably from 80° C. to 150° C.

The solid solvent as recited above is molten by heating, aand therein the present dyes may be dissolved, or dispersed or dissolved in the presence of an appropriate dispersant or binder More specifically, the ink-jet ink of this type can be prepared according to the method disclosed in JP-A-5-186723 or JP-A-7-70490.

It is desirable for the present dyes to be contained in a proportion of 0.2 to 10 parts, more preferably 0.5 to 6 parts, by weight to 100 parts by weight of ink-jet ink.

To the present ink-jet ink, other dyes than the present dyes may be added in individually proper amounts, if desired.

To the present ink-jet ink, various additives maybe added in individually proper amounts, if desired. Examples of such additives include a viscosity adjuster, a surface tension adjuster, a resistivity adjuster, a coat conditioner, an ultraviolet absorbent, an antioxidant, a fading inhibitor, an antimold, a rust preventive, a dispersant and a surfactant.

In the case where the present ink is water-based ink or oil-based ink, it is desirable that the viscosity of the ink be adjusted to 40 cp or below.

And it is desirable for the present ink to be adjusted so as to have its surface tension in the range of 20 to 100 dyn/cm when the ink is water-based ink or oil-based ink.

For forming full color images, the present ink with a magenta tint can be used in combination with ink of a cyan tint and ink of a yellow tint. Also, the ink with a black tint can further be used for tint adjustment.

The ink-jet recording method according to the invention has no particular restriction as to the recording paper used therein. From the viewpoints of image quality and durability upon image storage, however, it is advantageous to use a coated paper. The desirable modes of recording paper are illustrated below.

In the present ink-jet recording method, it is desirable to use a recording paper containing a polymer mordant.

Examples of such a polymer mordant include those disclosed in JP-A-48-28325, JP-A-54-74430, JP-A-54-124726, JP-A-55-22766, JP-A-55-142339, JP-A-55-23950, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236, and U.S. Pat. Nos. 2,484,430, 2,584,564, 3,148, 046, 3,309,690, 4,115,124, 4,124,386, 4,193,800, 4,273,853, 4,282,305 and 4,450,224.

In particular, the recording papers containing the. polymer mordants disclosed in JP-A-1-161236, pages 212–215, are used to advantage. This is because those polymer mordants can ensure excellent image quality and improved light fastness for the images formed in the recording papers.

In the present ink-jet recording method, the recording paper containing an inorganic pigment can be used. Such an inorganic pigment has no particular limitation on its kind, but every kind of inorganic pigment can be used. Examples of a usable inorganic pigment include silica pigments, alumina pigments, titanium oxide pigments, zinc oxide pigments, zirconium oxide pigments, micaceous iron oxide, white lead, lead oxide pigments, cobalt oxide pigments, strontium chromate, molybdenum pigments, smectite, magnesium oxide pigments, calcium oxide pigments, calcium carbonate pigments and mullite. These pigments may be used alone or as a mixture of two or more thereof.

In the present ink-jet recording method, the recording paper containing a hydrophilic binder of every kind can be used. Therein, it is possible to use all compounds hitherto known as hydrophilic binder, including gelatin and derivatives thereof, polyvinyl alcohol and derivatives thereof, polyalkylene oxides and derivatives thereof, and other polymers having high water-absorbing power. For instance, the compounds disclosed in JP-A-1-161236, pages 215–222, can be employed.

In the present ink-jet recording method, it is advantageous to use a recording paper containing a matting agent. The matting agent usable therein includes hitherto known ones, e.g., the matting agents described in JP-A-1-161236, pages 263–264.

In the present ink-jet recording method, the recording paper hardened with a hardener can be used. The hardener-used has no particular limitation on its kind, but all known hardeners, e.g., those described in JP-A-1-161236, page 222, can be used.

In the method of forming images in accordance with the invention, the recording paper hardened with a hardener can be used. The hardener used has no particular limitation on its kind, but all known hardeners, e.g., those described in JP-A-1-161236, page 222, can be used.

To the constituent layers of a recording paper used in the image forming method according to the invention, various kinds of surfactants can be added as a coating aid or for the purposes of improving releasability and slippability and preventing static electricity. Examples of a surfactant usable for such purposes are disclosed, e.g., in JP-A-62-173463 and JP-A-62-183457.

For the aforementioned purposes, organic fluorinated compounds may also be added. The representatives of such organic fluorinated compounds are the fluorine-containing surfactants disclosed, e.g., in JP-B-57-9053, columns 8–7 (the term "JP-B" as used herein means an "examined Japanese patent publication"), JP-A-61-20994 and JP-A-62-135826, or hydrophobic fluorinated compounds, including oily fluorinated compounds such as fluorinated oil, and solid fluorinated resins such as tetrafluoroethylene resin.

In the constituent layers of a recording material (including a backing layer), it is possible to contain various polymer latexes for the purposes of improving physical properties of coated layers, such as dimensional stability, curling resistance and abilities to inhibit adhesion and cracking. For instance, any of the polymer latexes disclosed, e.g., in JP-A-62-245258, JP-A-62-1316648 and JP-A-62-110066 can be used. In particular, the use of a polymer latex having a low glass transition point (40° C. or below) in a mordanting layer can prevent the layer from suffering cracks and enhance anti-curling ability of the layer; while the use of a polymer latex having a high glass transition point in a backing layer can produce anti-curling effect.

The constituent layers of a recording paper used for the present ink-jet recording method can contain a fading inhibitor. For instance, antioxidants, ultraviolet absorbents and certain metal complexes are known to be usable as a fading inhibitor. More specifically, the compounds described, e.g., in JP-A-1-161236, pages 225–247, can be used.

In the recording material may be used a brightening agent. In particular, it is desirable that the brightening agent be incorporated in the recording material or be applied externally to the recording material, e.g., by addition to ink.

The support of a recording material used for the invention has no particular restrictions. Even the paper laminated on both sides with a polyolefin (e.g., a homopolymer of ethylene, styrene, ethylene terephthalate or butene, and a copolymer of any combination of the monomers as recited above) and a plastic support (wherein the polyolefin preferably contains a white pigment, such as titanium oxide or zinc oxide, and tined with a dye, such as cobalt blue, ultramarine or neodymium oxide) are favorable for the support.

The present ink-jet recording method has no particular restrictions as to the recording system employed therein, but both continuous system and on-demand system can be adopted. And the present ink-jet recording method can be suitably applied to any of printers of bubble jet type, thermal jet type and ultrasonic wave-using type.

Recent years have brought remarkable progress in the ink-jet system. For instance, a large number of new systems, such as the system of jetting a good many ink drops having a small volume and a low concentration, or the so-called photoink, the system of using many kinds of ink having substantially the same hue but differing in concentration to improve image quality and the system of using colorless transparent ink, have been proposed and put to practical use. The present image-forming method can be suitably applied to any of the aforementioned systems, but its improving effects can be markedly produced, especially when it is applied to a printer of the type which has a high printing speed and jets low concentration of ink in large quantity to form images more or less equivalent to photos.

For forming images in accordance with a thermal transfer method, the present dyes represented by formula (I) can be used as thermal transfer dye donating materials incorporated in the coloring material layers provided on a support. The cases in which the thermally shifting dyes according to the invention are used for the image formation according to a thermal transfer system are illustrated below in detail. In general, dyes of three colors, namely yellow, magenta and cyan colors, are necessary to form a full color image. As to the colors other than the colors of the present dyes represented by formula (I), the dyes of required colors are selected from conventional dyes, and used together for full-color image formation. When the present dyes are dissociative dyes, it is desirable that the other dyes used in combination be also dissociative. Examples of such a dissociative dye include phenolic hydroxyl group-containing azo, azomethine and methine dyes.

The thermal transfer dye donating material can be used in the form of a sheet or a continuous roll or ribbon. In general the yellow, magenta and cyan dyes are arranged on a support so that they form their respective areas independently of one another. Each of the present dyes, together with a binder resin, is dissolved or dispersed in an appropriate solvent, and then coated on a support or printed on a support using a printing technique, e.g., a gravure technique. The suitable thickness of the dye donating layer containing such a dye is generally from about 0.2 $\mu$m to about 5 $\mu$m, particularly from 0.4 $\mu$m to 2 $\mu$m on a dry basis. The appropriate dye coverage is from 0.03 to 1 g/m$^2$, preferably from 0.1 to 0.6 g/m$^2$.

Examples of a binder resin usable together with the present dyes include polyamide resins, polyester resins, epoxy resins, polyurethane resins, polyacrylic resins (such as polymethyl methacrylate, polyacrylamide and copolymer of styrene and 2-acrylonitrile), polyvinyl pyrrolidone as an example of vinyl resins, polyvinyl chloride resins (such as a copolymer of vinyl chloride and vinyl acetate), polycarbonate resins, polystyrene, polyphenylene oxide, cellulose resins (such as methyl cellulose, ethyl cellulose, carboxymethyl cellulose, cellulose acetate hydrophthalate, cellulose acetate, cellulose acetate propionate, cellulose acetate butyrate and cellulose triacetate), polyvinyl alcohol resins (such as polyvinyl alcohol and partially saponified polyvinyl alcohols, e.g., polyvinyl acetal and polyvinyl butyral), petroleum resins, rosin derivatives, chroman-indene resins, terpene resins, and polyolefin resins (such as polyethylene and polypropylene). In the present invention, it is desirable that the binder resin as recited above be used in a proportion of about 20 to about 600 parts by weight to 100 parts by weight of dyes. As an ink solvent for dissolving or dispersing the dyes and binder resins as recited above, any of hitherto known ink solvents can be used.

Examples of a support material for thermal transfer dye donating materials include polyethylene terephthalate, polyamide, polycarbonate, glassine paper, condenser paper, cellulose ester, fluoropolymer, polyether, polyacetal, polyolefin, polyimide, polyphenylene sulfide, polypropylene, polysulfone and cellophane. The thickness of a support for the thermal transfer dye donating material is generally from 2 to 30 μm. The support may be provided with a subbing layer, if needed. Further, the dye donating material may be provided with a slipping layer for the purpose of preventing the adhesion to a thermal head. Such a slipping layer is formed using a lubricating substance, such as a surfactant, a solid or liquid lubricant, or a mixture thereof, in combination with a polymer binder, or a lubricating substance alone.

When the printing is carried out on the back of the dye donating material, it is desirable to subject the support of the dye donating material to a sticking prevention treatment on the side opposite to the dye donating layer side for the purpose of inhibiting the thermal head from suffering thermal sticking and increasing the sliding property. For instance, it is good for the foregoing purpose to provide a heat-resisting slip layer comprising (1) the products of the reaction between polyvinyl butyral resin and isocyanate, (2) the alkali metal salt or alkaline earth metal salt of a phosphoric acid ester and (3) a filler. In addition, sometimes cases occur in which the dye donating material is provided with a hydrophilic barrier layer in order to inhibit the dyes from diffusing in the direction of the support.

The dye donating material may be provided with a subbing layer. The subbing layer may be constituted of any materials as far as they can carry out the desired function. Suitable examples of such materials include acrylonitrile/vinylidene chloride/acrylic acid (14:90:6 by weight) copolymer, butyl acrylate/methacrylic acid/2-aminoethyl methacrylate/2-hydroxyethyl methacrylate (30:20:50 by weight) copolymer, linear saturated polyester such as Postic 7650 (trade name, produced by Emhart Co., Postic, Chemical Group), and high-density chlorinated polyethylene resin (e.g., ethylene/trichloroethylene copolymer resin). The subbing layer has no particular limitation on its coverage. In general the coverage of the subbing layer is from 0.1 to 2.0 g/m².

In the present invention, the thermal transfer dye donating material and a thermal transfer image-receiving material are superimposed on each other, and thereto the thermal energy corresponding to image information is applied using a heating means, such as a thermal head, from either side of the superimposed materials, preferably from the rear side of the thermal transfer dye donating material, thereby transferring the dyes in the dye donating layer(s) into the thermal transfer image-receiving layer in a quantity proportional to the thermal energy applied. In a similar manner, the fading inhibitor can also be transferred. As the heating means, not only a thermal head but also other known ones, such as a laser beam (e.g., a semiconductor laser beam), an infrared flash and a heat pen, can be used. In a laser beam-utilized system, the dye donating material containing a substance capable of intensely absorbing the laser beam is employed. Such an absorbing substance is present in a layer underneath the dye or/and as a mixture with the dye. The laser beam is modulated by electric signals representing the shape and the color of an original image to heat only dyes present in the areas necessary to reproduce the original image color among all the areas on the dye donating material, thereby carrying out thermal transfer of the dyes. The more detailed explanation of such a process can be found in British Patent 2,083,726 A. This patent discloses carbon as the absorbing substance for laser system use. When it is combined with a thermal transfer image-receiving material, the present thermal transfer dye donating material can be applied to the printing with various printers utilizing a thermal printing method, the print formation of images by the use of a facsimile or utilizing a magnetic or optical recording method, and the print formation from a television or CRT screen.

In a preferred embodiment of the invention, the dye donating material comprises a polyethylene terephthalate support on which cyan, magenta and yellow dyes are coated one after another in repeated areas, and the transferred images with three colors are formed in succession by performing the foregoing process for each color. Of course, when this process is carried out with a single color, the monochromatic transferred image is obtained. For thermal transfer of dyes from the dye donating material into the image-receiving material, several kinds of laser, including gas laser such as argon or krypton ion laser, metal vapor laser such as copper, gold or cadmium metal vapor laser, solid laser such as ruby or YAG laser, and a semiconductor laser which can emit light in the infrared region of 750 to 870 nm, such as Ga-As semiconductor laser, can be employed. In practice, however, the use of semiconductor laser is advantageous from the viewpoints of small size, low cost, stability, reliability, durability and easy modulation.

The thermal transfer image-receiving material used in combination with the present thermal transfer dye donating material is a material having on a support an image-receiving layer comprising a basic substance capable of receiving the dyes transferred from the dye donating material and functioning so as to dissociate the received dyes and/or a mordant alone, or in combination with a binder substance. (Hereinafter, such a basic substance and a mordant are referred to as a dye-fixing agent.)

The dye-fixing agent includes a compound having a primary, secondary or tertiary amino group, preferably a tertiary amino group, a compound having a nitrogen-containing heterocyclic group, and a compound obtained by converting the nitrogen-containing group of the compound as recited above into a quaternary cationic group.

Now, the invention will be illustrated in greater-detail by reference to the following examples, but these embodiments should not be construed as limiting the scope of the invention in any way.

EXAMPLE 1

Synthesis of Present Dye (2):

The present Dye (2) was synthesized by the route shown below;

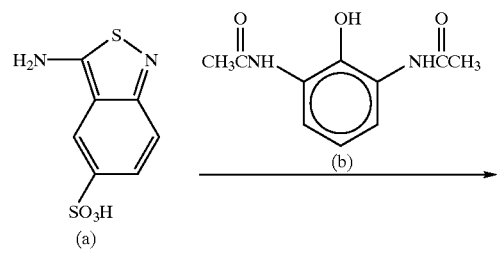

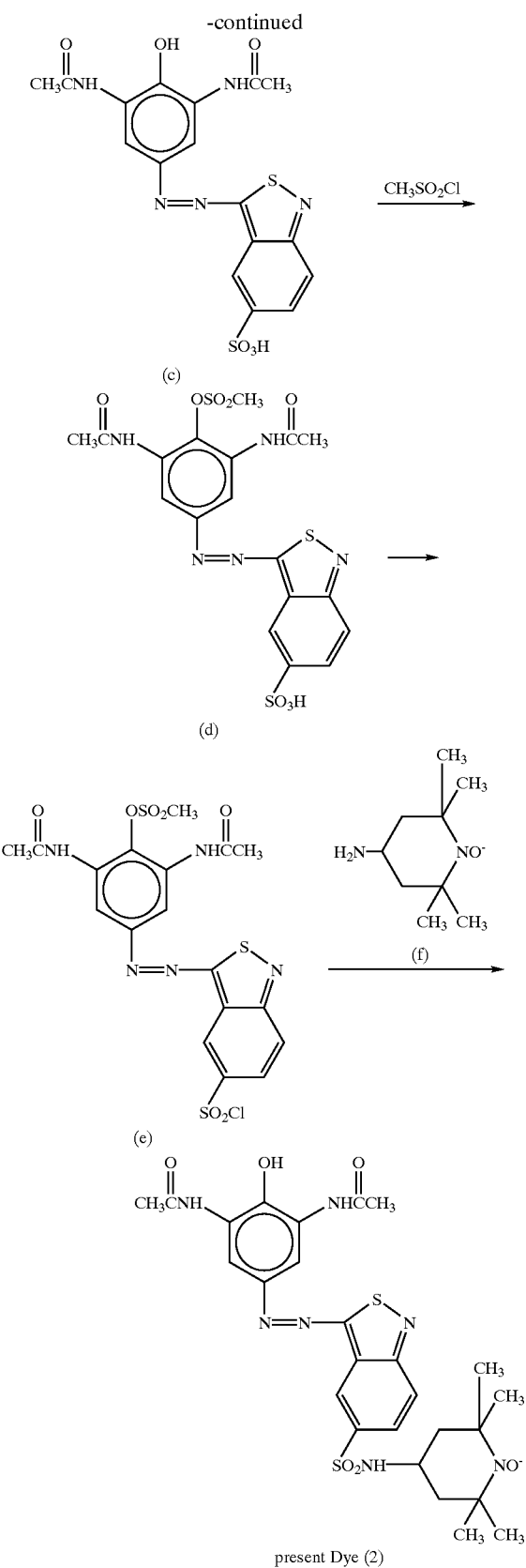

present Dye (2)

Compound (a) in an amount of 23 g was dissolved in a mixture of 100 ml of water with 14 ml of triethylamine, and thereto 43 ml of concentrated hydrochloric acid was added dropwise with stirring at a temperature of 10–15° C. A solution containing 8.3 g of sodium nitride in 20 ml of water was added dropwise to the foregoing solution of Compound (a) with stirring at a temperature of 5–8° C., and the stirring was further continued for 30 minutes. On the other hand, 20.8 g of Compound (b) was dissolved in a mixture of 100 ml of water and 70 ml of triethylamine, and thereto the diazonium salt prepared in the foregoing manner was added dropwise with stirring at a temperature of 9–11° C. At the conclusion of the addition, the temperature of the reaction solution was raised to 25° C., and the stirring was continued for 30 minutes. The resultant reaction solution was poured into 500 ml of a 25% brine containing 26 ml of concentrated hydrochloric acid. The crystals thus deposited were filtered off, washed by pouring a 25% brine thereon, and then dried to give 31 g of Compound (c) as reddish-brown crystals mp: 259–262° C., yield: 65.8%.

Compound (c) in an amount of 47.1 g was dissolved in a mixture of 100 ml of dimethylformamide with 20 ml of triethylamine, and thereto 15 g of methanesulfonyl chloride was added dropwise with stirring at a temperature of 15–20° C. After the addition was concluded, the stirring was continued for 30 minutes, and then the reaction mixture obtained was poured into 400 ml of 25% brine. The crystals thus deposited were filtered off, washed by pouring 100 ml of 25% brine thereon, and then dried to give 38 g of Compound (d) as yellow crystals. mp: 257–259° C., yield: 69.1%

The mixture of 20 ml of dimethylacetamide with 100 ml of acetonitrile was added to 20 g of Compound (d), and thereto 45 g of phosphoric oxychloride was added dropwise with stirring at a temperature of 9–12° C. After the addition was completed, the reaction mixture was stirred for 1 hour at a temperature of 70° C., and then cooled to 30° C. The resultant reaction mixture was poured into 200 ml of 10° C. water. The crystals thus deposited were filtered off, washed by pouring 100 ml of cold water thereon, and then dried under reduced pressure to give 9.8 g of Compound (e) as yellow crystals. mp: 244–245° C., yield: 49.2%.

Compound (f) in an amount of 1.8 g was dissolved in 20 ml of dimethylformamide, and thereto 1.0 ml of pyridine was added and further 5.5 g of Compound (e) was added little by little with stirring at a temperature of 10–12° C. After the addition was concluded, the stirring was continued for 1 hour, and then 4 g of diethylamine was added. The resultant reaction mixture was stirred for 30 minutes at a temperature of 30° C., and then poured into 60 ml of water containing 3 ml of concentrated hydrochloric acid. The crystals thus deposited were filtered off, washed by pouring 100 ml of cold water thereon, and then dried to give dark red crystals. These crystals were dissolved in 5 ml of dimethylformamide, and then 50 ml of acetonitrile was added. The crystals thus deposited was filtered off, washed by pouring 30 ml of acetonitrile thereon, and then dried to give 3.2 g of red crystals (the present Dye (2)). mp: 147–153° C., yield: 53.4%, $\lambda$max: 677 nm (DMF).

EXAMPLE 2

Synthesis of Present Dye (15):

The synthesis-was carried out in the same manner as in Example 1, except that 1.8 g of Compound (f) was replaced by 2 g of 4-amino-2,2,6,6-tetramethylpiperidine. Thus, 3,5 g of black crystals (the present Dye (15)) was obtained. mp: 246–251° C., yield: 60.0 %, $\lambda$max: 676 nm (DMF).

EXAMPLE 3

A coating composition composed of 43 parts (the term "parts" as used herein and hereinafter is by weight on a solids basis) of styrene-acrylate copolymer hollow fine particles (particle size: 0.3 to 0.4μ), 17 parts of anhydrous silica prepared by a vapor phase method (grain size: 12 mμ), 12 parts of styrene-butadiene copolymer latex, 18 parts of polyvinyl acetate latex and 10 parts of polymethyl methacrylate fine particles (particle size: about 8μ) was coated on a commercial uncoated base paper (basis weight: 64 g/m$^2$) so as to have a dry coverage of 10 g/m$^2$ by means of a wire bar, thereby preparing an ink-jet recording paper.

On the recording paper thus prepared, the ink-jet recording was carried out under a definition of 8 dotted lines per mm by the use of an electrostatic acceleration type ink-jet apparatus furnished with liquid ink having the following composition and a head having a nozzle aperture diameter of 50μ.

Composition of Liquid Ink A:

| Present Dye (3) | 6 parts by weight |
|---|---|
| Diethyl phthalate | 30 parts by weight |
| Diisopropyl adipate | 44 parts by weight |
| N,N-Diethyldodecanamide | 20 parts by weight |

The liquid ink A was jetted smoothly to print high-density clear magenta images. Even when the paper printed in this ink was soaked in water for 10 minutes, neither bleeding nor running of the ink was observed.

EXAMPLE 4

Liquid inks of five kinds, B to F, having the following compositions respectively were prepared.

Composition of Liquid Ink B:

| Present Dye (2) | 6 parts by weight |
|---|---|
| Dibutyl adipate | 70 parts by weight |
| Benzyl alcohol | 20 parts by weight |

Composition of Liquid Ink C:

| Present Dye (6) | 6 parts by weight |
|---|---|
| Dibutyl maleate | 61 parts by weight |
| Diethyl phthalate | 22 parts by weight |
| N-Methylpyrrolidone | 5 parts by weight |

Composition of Liquid Ink D:

| Present Dye (14) | 6 parts by weight |
|---|---|
| Diethyl adipate | 41 parts by weight |
| Diethyl phthalate | 30 parts by weight |
| Dipropylene glycol monomethyl ether | 20 parts by weight |

Composition of Liquid Ink E:

| Present Dye (15) | 6 parts by weight |
|---|---|
| Dibutyl maleate | 54 parts by weight |
| Diethyl phthalate | 25 parts by weight |
| Benzyl alcohol | 15 parts by weight |

Composition of Liquid Ink F (Comparative Ink):

| Comparative Dye (A) | 6 parts by weight |
|---|---|
| Dibutyl maleate | 54 parts by weight |
| Diethyl phthalate | 25 parts by weight |
| Benzyl alcohol | 15 parts by weight |

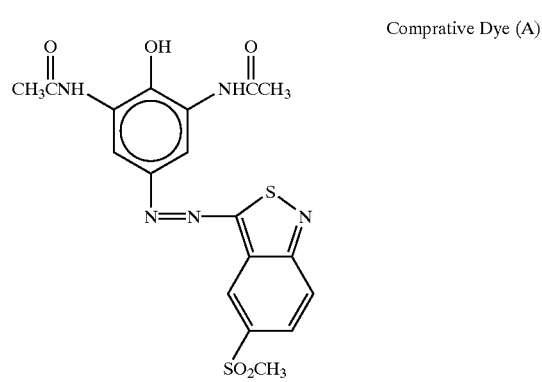

Comprative Dye (A)

The printing was carried out in the same manner as in Example 2, except that the ink used was each of the liquid inks prepared herein and the recording paper used was ink-jet paper produced by Fuji Photo Film Co. Ltd., Super Photo Grade (photo glossy paper). All the inks prepared were jetted smoothly, but clear cyan images were obtained in only the cases of using the inks B to E.

The rate of density drop caused by exposing the printed clear cyan images to indoor light for 3 months was 3% or below in the inks A to E. In other words, the inks according to the invention had excellent fastness to light.

EXAMPLE 5

Water-based ink G having the following composition was prepared.

Composition of Ink G:

| Present Dye (1) | 4 parts by weight |
|---|---|
| Diethylene glycol | 9 parts by weight |
| Tetraethylene glycol monobutyl ether | 9 parts by weight |
| glycerine | 7 parts by weight |
| Diethanolamine | 1 parts by weight |
| Water | 70 parts by weight |

The foregoing composition was stirred for one hour while warming to a temperature of 30–40° C. and then, under pressure, passed through a micro-filter having a diameter of 47 mm and openings which was 0.8μ in average diameter, thereby preparing the desired ink.

Other water-based inks H to M were prepared in the same manner as the water-based Ink G, except that the present Dye (1) was replaced by the dyes shown in Table 1, respectively.

The printing with each of the water-based Ink G to M was carried out on ink-jet paper produced by Fuji Photo Film Co., Ltd., Super Photo Grade (photo glossy paper) by means of an ink-jet printer PM-700C (produced by Seiko Epson Corporation), thereby preparing image samples.

The thus prepared image samples were examined for hue and fastness to light, and evaluated as follows:

<Hue>

Hue was evaluated by the following equation:

$\chi$=Density at 550 nm (absorbance)/Maximum density at the cyan image portion (absorbance)

○: $\chi \leq 0.15$
Δ: $0.16 \leq \chi \leq 0.24$
X: $0.25 \leq \chi$

According to visual observation, the cyan images printed in the present Inks G to K were clearer than the cyan image printed in the comparative Ink M.

<Fastness to Light>

Each image sample was exposed to xenon light (85,000 lux) for 3 days by means of an Atlas C. I65 weather meter, and the image densities before and after the exposure to xenon light were measured with a reflection densitometer (X-Rite 310TR). The image stability to light was evaluated by the residual dye rate.

From the reflection densities that each image sample had before exposure, three reflection density points 1.0, 1.5 and 2.0 were chosen, and the residual dye rates at these points were determined. In the evaluation of fastness of each ink to light, cases that the residual dye rate was at least 80% at every point defined above were symbolized by the mark ○, cases that the residual dye rate was at least 80% at one or two points of the above three points were symbolized by the mark Δ, and the other cases were symbolized by the mark X. The results obtained are shown in Table 1. As can be seen from Table 1, the images printed with the present inks were highly fast to light.

TABLE 1

| Water-based Ink Sample No. | Dye | Hue | Fastness to light | Note |
| --- | --- | --- | --- | --- |
| G | present Dye (1) | ○ | ○ | invention |
| H | present Dye (8) | ○ | ○ | invention |
| I | present Dye (9) | ○ | ○ | invention |
| J | present Dye (10) | ○ | ○ | invention |
| K | present Dye (16) | ○ | ○ | invention |
| M | comparative Dye (C) | Δ | X | comparison |

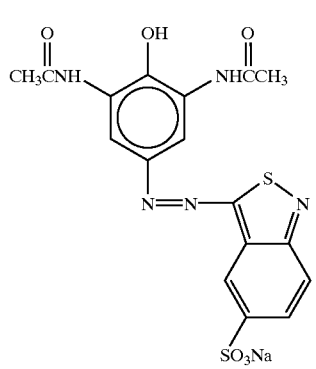

Comparative Dye (C)

Further, the printing with each of the ink samples G to M was carried out on glossy paper for superfine only (MJA4S3P) produced by Seiko Epson Corporation by means of an ink-jet printer P-700C (produced by Seiko Epson Corporation), and image samples were prepared in the same manner as described above. These samples achieved almost the same results as shown in Table 1 in both examinations for hue and fastness to light. However, the results obtained using the ink-jet paper, Super Photo Grade (photo glossy paper) produced by Fuji Photo Film Co., Ltd., were better than those obtained using the glossy paper produced by Seiko Epson Corporation.

EXAMPLE 6

<Preparation of Thermal Transfer Dye-donating Material (1-1)>

A 6 μm-thick polyethylene terephthalate film which had undergone heat-resisting lubrication treatment on the back side was used as a support. On the surface of this film, the coating composition (set forth in Table 2) for a thermal transfer dye donating layer was coated using a wire-bar coating technique so as to have a dry thickness of 1.5 μm, thereby preparing a thermal transfer dye donating material (1-1).

TABLE 2

| Coating Composition for Thermal Transfer Dye-donating Layer | |
| --- | --- |
| Present Dye (2) | 8 mmol |
| Polyvinyl butyral resin (Denka Butyral 5000-A, trade name, a product of Denki Kagaku Kogyo Kabushiki Kaisha) | 3 g |
| Toluene | 40 ml |
| Methyl ethyl ketone | 40 ml |
| Polyisocyanate (Takenate D110N, trade name, a product of Takeda Chemical Industries Co., Ltd.) | 0.2 ml |

Further, thermal transfer dye donating materials (1-2) to (1-4) according to the invention and a thermal transfer dye donating material (1-5) for comparison were prepared in the same manner as the foregoing thermal transfer dye donating material (1-1), except that the present Dye (2) was replaced by the dyes set forth in Table 3, respectively.

TABLE 3

| Sample No. | Dye | Remarks |
| --- | --- | --- |
| 1-1 | present Dye (2) | Invention |
| 1-2 | present Dye (8) | Invention |
| 1-3 | present Dye (14) | Invention |
| 1-4 | present Dye (15) | Invention |
| 1-5 | comparative Dye (A) | Comparison |

<Preparation of Thermal Transfer Image-receiving Material A>

Synthetic paper having a thickness of 150 μm (YUPO-FPG-150, trade name, a product of Oji-Yuka Synthetic Paper Co., Ltd.) was used as a base material. On the surface of this base material, the coating composition (set forth in Table 4) for a thermal transfer image-receiving layer was coated using a wire-bar coating technique so as to have a dry thickness of 8 μm, thereby preparing a thermal transfer image-receiving material.

Therein, the drying of the coated layer was carried out by undergoing a temporary drying with a dryer, and then being placed in a 100° C. oven for 30 minutes.

TABLE 4

| Coating Composition A for Image-receiving Layer | |
| --- | --- |
| AFA (produced by Sankyo Company Limited) | 22 g |
| Polyisocyanate (KP-90, trade name, a product of Dai-Nippon Ink & Chemicals, Inc.) | 4 g |
| Amino-modified silicone oil (KF-857, trade made, a product of Shin-etsu Silicone Co., Ltd.) | 0.5 g |

TABLE 4-continued

| Coating Composition A for Image-receiving Layer | |
| --- | --- |
| Methyl ethyl ketone | 85 ml |
| Toluene | 85 ml |
| Cyclohexanone | 15 ml |

The image-receiving material after recording by the use of each of the foregoing dye donating materials was irradiated with a fluorescent lamp of 17,000 lux for 3 days, and thereby the image fastness to light was examined. The evaluation of the image fastness in each case was made by the residual dye rate in the area having the reflection density of 1.0. Further, each image-receiving material after recording was stored in a 60° C. oven for 2 weeks, and then the extent of bleeding developed in the image was observed. As the evaluation standards, grading according to 5 ranks was adopted. More specifically, a case that the image had hardly changed by the storage was graded 5, a case that a slight bleeding was developed in the image by the storage was graded 3, and a case that the image was blurred due to bad bleeding was graded 1. In addition, a case that the extent of bleeding was regarded as intermediate between the former two cases was graded 4, and a case that the extent of bleeding was regarded as intermediate between the latter two cases was graded 2. The evaluation results obtained are shown in Table 5. As can be seen from Table 5, the use of the present dyes ensured high density and high definition in the transferred images, and besides, they caused no blur in the images by aging. In addition, no color offset (color stains developed by unintentional transfer of dyes from the surface having transferred image to another image-receiving paper having no transferred image in contact with the front or rear surface thereof) was observed in all the cases of using the present dyes.

TABLE 5

| Sample No. | Residual dye rate (%) | Blur Evaluation | Remarks |
| --- | --- | --- | --- |
| 1-1 | 61 | 3 | Invention |
| 1-2 | 56 | 4 | Invention |
| 1-3 | 58 | 3 | Invention |
| 1-4 | 51 | 4 | Invention |
| 1-5 | 42 | 2 | Comparison |

As described above, the azo dyes represented by formula (I) of the present invention are excellent in fastness to light, and provide clear images for ink-jet ink and clear and less color offset images for a thermal transfer dye donating material.

According to the present invention, an azo dye having excellent spectral characteristics and high fastness to light, heat, air and chemicals can be obtained. Further, an ink-jet ink and an ink-jet recording method suitable for forming images of high fastness can also be obtained. Furthermore, a thermal transfer dye donating material having high stability to light, heat, air and chemicals can also be obtained.

While the invention has been described in detail and with reference to specific embodiments thereof, it will be apparent to one skilled in the art that various changes and modifications can be made therein without departing from the spirit and scope thereof.

What is claimed is:
1. An azo dye represented by the following formula (I):

(I)

wherein Z represents an atomic group which forms, together with a nitrogen atom, a five-, six- or seven-membered ring, $R_1$ represents a hydrogen atom, an oxy radical, an aliphatic group, an aliphatic oxy group, an acyl group, an aliphatic oxycarbonyl group, an aryloxycarbonyl group or an acyloxy group, $R_2$, $R_3$, $R_4$ and $R_5$, which may be the same or different, each represents an alkyl group, or $R_2$ and $R_3$ and/or $R_4$ and $R_5$ may be combined with each other to form a ring, and Dye represents a dye moiety group necessary for forming an azo dye.

2. The azo dye according to claim 1, which is represented by the following formula (Ia):

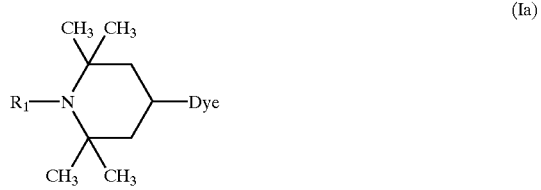

(Ia)

wherein $R_1$ represents a hydrogen atom, an oxy radical, an aliphatic group, an aliphatic oxy group, an acyl group, an aliphatic oxycarbonyl group, an aryloxycarbonyl group or an acyloxy group, and Dye represents a dye moiety group necessary for forming an azo dye.

3. The azo dye according to claim 1, wherein $R_1$ in formula (I) represents a hydrogen atom, an oxy radical, an aliphatic group or an aliphatic oxy group.

4. The azo dye according to claim 1, wherein $R_1$ in formula (I) represents a hydrogen atom or an oxy radical.

5. An azo dye represented by the following formula (I):

(I)

wherein Z represents an atomic group which forms, together with a nitrogen atom, a five-, six-or seven-membered ring, $R_1$ represents an oxy radical, $R_2$, $R_3$, $R_4$ and $R_5$, which may be the same or different, each represents an alkyl group, or $R_2$ and $R_3$ and/or $R_4$ and $R_5$ may be combined with each other to form a ring, and Dye represents a dye moiety group necessary for forming an azo dye.

6. The azo dye according to claim 1, wherein Dye in formula (I) represents a moiety derived from an azo dye represented by the following formula (II):

A—N=N—B  (II)

wherein A and B each represent an aromatic group wherein at least one of A and B is substituted for a hydrogen on the five-, six- or seven-membered ring.

7. The azo dye according to claim 6, wherein A in the formula (II) is an aryl group or a heterocyclic group.

8. The azo dye according to claim 6, wherein A in the formula (II) is selected from the group consisting of the following formulae (A-1) to (A-6):

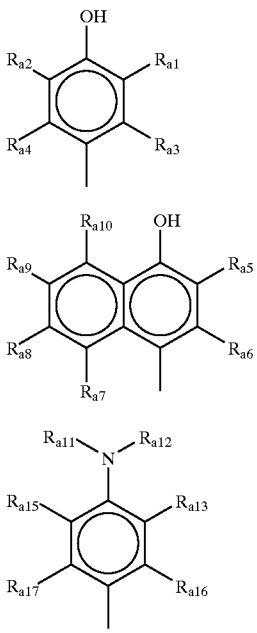

Formula (A-1)

Formula (A-2)

Formula (A-3)

Formula (A-4)

Formula (A-5)

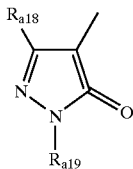

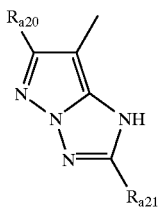

Formula (A-6)

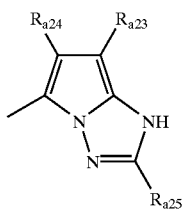

wherein each of $R_{a1}$ to $R_{a13}$, $R_{a15}$ to $R_{a21}$ and $R_{a23}$ to $R_{a25}$ represents a hydrogen atom or a substituent group.

9. The azo dye according to claim 6, wherein B in the formula (II) is an aryl group or a heteryl group.

10. The azo dye according to claim 6, wherein B in the formula (II) is selected from the group consisting of the following formulae (B-1) to (B-4):

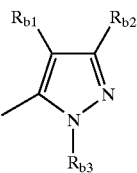

Formula (B-1)

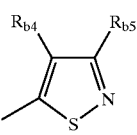

Formula (B-2)

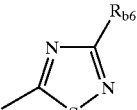

Formula (B-3)

Formula (B-4)

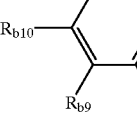

wherein each of $R_{b1}$ to $R_{b10}$ represents a hydrogen atom or a substituent group.

11. Ink-jet ink, comprising an azo dye as defined in claim 1.

12. Ink-jet ink, comprising an azo dye which is represented by the following formula (Ia):

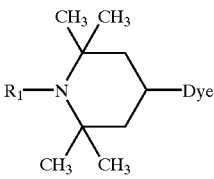

(Ia)

wherein $R_1$ represents a hydrogen atom, an oxy radical, an aliphatic group, an aliphatic oxy group, an acyl group, an aliphatic oxycarbonyl group, an aryloxycarbonyl group or an acyloxy group, and Dye represents a dye moiety group necessary for forming an azo dye.

13. The ink-jet ink according to claim 11, wherein Dye in formula (I) represents a moiety derived from an azo dye represented by the following formula (II):

$$A-N=N-B \quad (II)$$

wherein A and B each represent an aromatic group wherein at least one of A and B is substituted for a hydrogen on the five-, six- or seven-membered ring.

14. The ink-jet ink according to claim 13, wherein A in the formula (II) is an aryl group or a heterocyclic group.

15. The ink-jet ink according to claim 13, wherein A in the formula (II) is selected from the group consisting of the following formulae (A-1) to (A-6):

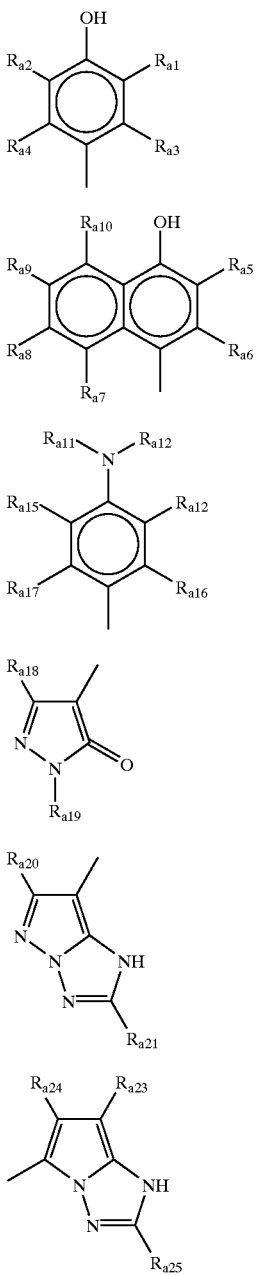

Formula (A-1)

Formula (A-2)

Formula (A-3)

Formula (A-4)

Formula (A-5)

Formula (A-6)

wherein each of $R_{a1}$ to $R_{a13}$, $R_{a15}$ to $R_{a21}$ and $R_{a23}$ to $R_{a25}$ represents a hydrogen atom or a substituent group.

16. The ink-jet ink according to claim 13, wherein B in the formula (II) is an aryl group or a heteryl group.

17. The ink-jet ink according to claim 13, wherein B in the formula (II) is selected from the group consisting of the following formulae (B-1) to (B-4):

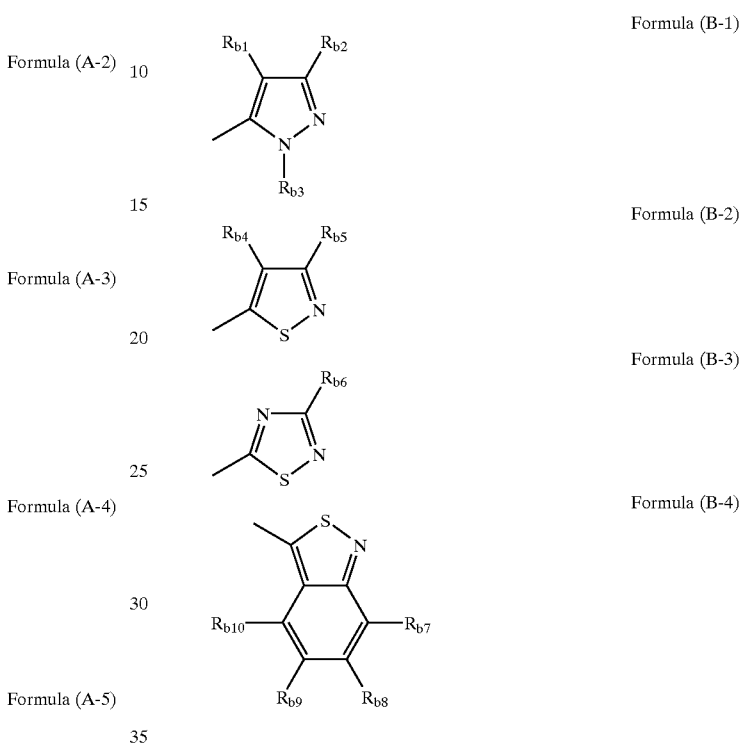

Formula (B-1)

Formula (B-2)

Formula (B-3)

Formula (B-4)

wherein each of $R_{b1}$ to $R_{b10}$ represents a hydrogen atom or a substituent group.

18. The ink-jet ink according to claim 11, wherein the content of said azo dye is 0.2 to 10%.

19. An ink-jet recording method which comprises jetting ink as oil droplets to record images on an image-receiving material, said ink being ink as defined in claim 6.

20. A thermal transfer recording material comprising a thermal transfer dye donating material and a thermal transfer image-receiving material, said dye donating material containing at least one azo dye as defined in claim 1.

* * * * *